United States Patent [19]

Mintgen et al.

[11] Patent Number: 5,120,011
[45] Date of Patent: Jun. 9, 1992

[54] COLUMN UNIT

[75] Inventors: Rolf Mintgen, Thür; Hans-Josef Hosan, Neuwied, both of Fed. Rep. of Germany

[73] Assignee: Stabilus GmbH, Koblenz-Neuendorf, Fed. Rep. of Germany

[21] Appl. No.: 582,558

[22] Filed: Sep. 14, 1990

[30] Foreign Application Priority Data

Sep. 27, 1989 [DE] Fed. Rep. of Germany ....... 3932146

[51] Int. Cl.$^5$ ............................................. F16M 11/00
[52] U.S. Cl. .............................. 248/162.1; 384/609; 384/617; 297/345
[58] Field of Search ................. 248/162.1, 415, 416, 248/631; 384/609, 611, 615, 617; 297/345, 349, DIG. 3

[56] References Cited

U.S. PATENT DOCUMENTS

| | | | |
|---|---|---|---|
| 594,261 | 11/1897 | Meltzer | 384/609 |
| 642,615 | 2/1900 | Kragh | 384/609 |
| 676,939 | 6/1901 | Eveland | 384/609 |
| 1,791,828 | 2/1931 | Mizer | 384/615 X |
| 4,336,972 | 6/1982 | Dagiel . | |
| 4,627,602 | 12/1986 | Sporck | 297/345 X |
| 4,693,442 | 9/1989 | Sills | 297/345 X |
| 4,940,202 | 7/1990 | Hosan et al. | 248/162.1 |

FOREIGN PATENT DOCUMENTS

3642699 6/1988 Fed. Rep. of Germany .
2658748C2 3/1989 Fed. Rep. of Germany .
1366865 11/1974 United Kingdom .

*Primary Examiner*—Carl D. Friedman
*Assistant Examiner*—Korie H. Chang
*Attorney, Agent, or Firm*—Brumbaugh, Graves, Donohue & Raymond

[57] ABSTRACT

According to an illustrative example, a chair column comprises a stand tube. A gas spring is inserted in the stand tube with the piston rod thereof directed downwardly toward an abutment wall of the stand tube. The lower end of the piston rod is connected to the abutment wall and is rotatably supported on the abutment wall by a ball bearing. The ball bearing comprises two bearing discs and a plurality of balls therebetween. The bearing discs and the balls are pre-assembled by a cage. The bearing can be pre-assembled before it is combined with the lower end of the piston rod and is mounted thereafter on the lower end of the piston rod. The cage remains within the chair column when the gas spring is inserted subsequently into the stand tube together with the bearing.

35 Claims, 3 Drawing Sheets

COLUMN UNIT

BACKGROUND OF THE INVENTION

Chair columns and table columns comprise a stand tube and a strut unit inserted into the stand tube. The strut unit is rotatable within the stand tube. Between the lower end of the insert strut unit and abutment means of the stand tube, roller bearing means are provided for allowing the insert strut unit to rotate wihtout substantial friction even under load.

STATEMENT OF THE PRIOR ART

According to German Patent Publication No. 36 42 699, a chair column comprises a stand tube having a bottom wall and an upper insert opening. A gas spring is axially inserted in the stand tube with the piston rod of the gas spring directed downwards toward the bottom wall. A ball bearing unit is provided between the bottom wall and a support ring fastened to the piston rod. This ball bearing comprises a first bearing disc adjacent the bottom wall, a ball cage and a second bearing disc adjacent the support ring on the piston rod. The lower end portion of the piston rod passes through a central opening of the bottom wall and is fixed to the lower side of the bottom wall by a spring clip. The components of the ball bearing, i.e. the two bearing discs and the ball cage with the balls therein, are separated from each other and are separately mounted on the piston rod before passing the piston rod through the opening of the bottom wall.

It is cumbersome and time consuming to assemble the ball bearing components separately when inserting the piston rod end into the central opening of the bottom wall.

In order to facilitate the assembly of the chair column, it is known to provide securing means on the lower end of the piston rod. These securing means comprise e.g. an O-ring inserted in an additional groove of the piston rod end portion or an additional spring ring. By such securing means, the components of the ball bearing are captively connected to the lower end portion of the piston rod during storage and transportation. However, the assembly is complicated nevertheless since the various components of the ball bearing are separately mounted on the piston rod and are secured thereafter by the O-ring or the additional spring ring.

OBJECT OF THE INVENTION

It is a primary object of the present invention to allow preassembly of the various roller bearing components to a pre-assembled unit which can be mounted thereafter on the lower end of an insert strut to be inserted in a stand tube.

A further object underlying the present invention is to facilitate the combination of the insert strut and the pre-assembled roller bearing unit.

A still further object of the present invention is to facilitate the assembly of the insert strut and the stand tube with the pre-assembled roller bearing unit therebetween.

A still further object of the present invention is to provide simple and low cost assembling means for assembling the roller bearing components to a pre-assembled unit.

SUMMARY OF THE INVENTION

In order to accomplish at least the first mentioned object, a column unit comprises a stand tube having an axis and two end portions, a first end portion provided with axial abutment means, and a second end portion with an insert opening. The column unit further comprises an insert strut unit to be inserted into the stand tube through the insert opening along the axis. The insert strut unit has a first end portion adjacent the first end portion of the stand tube and a second end portion outside the stand tube. The insert strut unit is rotatable with respect to the stand tube about the axis thereof and is axially fixed adjacent its first end portion with respect to the abutment means of the stand tube. Roller bearing means are provided axially between the first end portion of the insert strut unit and the abutment means of the stand tube. The roller bearing means comprise a first bearing face supported by the abutment means, a second bearing face supported by the insert strut unit, and a plurality of roller bodies axially between the first and second bearing faces. At least one of the bearing faces is provided by a separate bearing disc. A pre-assembling holder unit is provided which holds the at least one bearing disc and the roller members together as a pre-assembled unit. This pre-assembled unit is pre-assembled before being combined with the insert strut unit and remains within the column unit after combining the stand tube, the insert strut, and the pre-assembled unit.

According to the present invention, the roller bearing means can be pre-assembled at any desired time and manufacturing place. They need not necessarily be pre-assembled by the manufacturer of the insert strut unit. It rather is possible for the chair manufacturer or chair column manufacturer to purchase the insert strut unit and the pre-assembled bearing unit from different suppliers and to combine them, as desired. There is no risk of wrongly combining the components of the pre-assembled unit with one another and of wrongly combining the unit as a whole with the insert strut unit.

When the chair column is disassembled. e.g. for repair purposes, the pre-assembled bearing unit can be handled again as such without the risk of components thereof coming apart. That is of special importance if the pre-assembled bearing unit contains a lubricant.

According to a preferred embodiment of the invention, the first and the second bearing faces are provided by respective first and second bearing discs. In this case the pre-assembled unit comprises both said first and second bearing discs.

Obviously the possible pre-assembly will provide even more advantages if the bearing comprises a larger number of components. The first end portion of the insert strut unit may, as is known from German Lay-open print No. 36 42 699, including a terminal stud extending through central holes of the bearing faces and surrounded by a plurality of rollers.

As is known from the cited German Publication, this terminal stud may penetrate the abutment means for fixing the insert strut unit with respect to the abutment means so that the insert strut unit cannot be withdrawn from the stand tube in operation. The fixation of the terminal stud with respect to the abutment means can be accomplished e.g. by a spring clip, as is shown in German Lay-Open Print No. 36 42 699.

The abutment means of the stand tube may comprise an abutment wall adjacent the first end portion of the stand tube. In this case the insert strut unit may be axially fixed to the abutment wall, e.g. by a spring clip, as is shown in the German Publication.

In order to facilitate the mounting of the pre-assembled bearing unit on the insert strut unit, the pre-assembling holder unit may have first engagement means for engagement with the insert strut unit. These first engagement means may be first snap engagement means for snap engagement with the insert strut unit when the insert strut unit axially approaches the pre-assembled unit. The first engagement means may be engageable e.g. with a circumferential, radially outwardly open groove of the insert strut unit adjacent the first end portion thereof.

According to the above-cited German Publication, it is necessary to apply a separate spring clip to the lower end of the piston rod after the piston rod has been passed through the central opening of the bottom wall for fixing the piston rod with respect to the bottom wall against withdrawal from the stand tube.

In accorance with the present invention, the assembly of the column unit as a whole can be facilitated in that the pre-assembling holder unit has second engagement means engageable with the abutment means. These second engagement means again may be second snap-engagement means for snap engagement with the abutment means when the pre-assembled unit axially approaches the first end portion of the stand tube. These second engagement means may be engageable e.g. with a circumferential edge of a cental opening provided in an abutment wall of the stand tube adjacent the first end portion thereof.

Various embodiments of the pre-assembling holder are possible.

According to a first embodiment, the pre-assembling holder unit comprises a roller cage portion receiving the roller members, a first disc holder portion engaging the first bearing disc, and a second disc holder portion engaging the second bearing disc.

The advantage of this embodiments resides in that the pre-assembling holder unit fulfils by its roller cage portion also the function of a roller cage so that a separate roller cage is not required. At least one of the disc holder portions may make snap engagement with the respective bearing disc so that the pre-assembly of the pre-assembled unit is facilitated.

A very compact design of the pre-assembled unit adapted for insertion of a stand tube may be obtained when the first disc holder portion is engaged with a circumferential edge of a central hole of the first bearing disc and when the second disc holder portion is engaged with a radially outer, circumferential edge of the second bearing disc.

In this embodiment, the first disc holder portion may comprise first engagement means for snap engagement with the first end portion of the insert strut unit. The roller cage portion, the first disc holder portion, and the second disc holder portion may be integrally shaped, e.g. from synthetic plastic material or rubber material.

According to another embodiment, the pre-assembling holder unit comprises a pot member having a pot bottom and pot wall means. In this embodiment, a first bearing disc, a roller cage receiving the roller bodies, and a second bearing disc may be superposed on the pot bottom and the pot wall means may be provided with securing means for securing the bearing discs and the roller cage within the pot member. These securing means may be snap securing means for facilitating the pre-assembly. The pot wall means may be comprised of a plurality of spring tongues.

For facilitating the combination of the insert strut unit and the pre-assembled bearing unit, the pot bottom may have a central hole. A terminal stud of the first end portion of the insert strut unit may extend through this central hole. The bottom may be provided adjacent the central hole with first engagement means engageable with a radially outwardly open, circumferential groove of the terminal stud. These first engagement means again may be first snap engagement means for snap engagement with the groove when the stud is axially introduced in the central hole.

The above-described pot-based embodiment is particularly suited for the realization of the above idea of facilitating the combination of the insert strut unit and the stand tube. The bottom wall may be provided for this purpose adjacent the central hole with second engagement means engageable with a circumferential edge of a central opening provided in an abutment wall adjacent the first end portion of the stand tube.

With this embodiment, the first and second engagement means m be provided by a plurality of multiple-bent spring strips; the first engagement means may be provided in such a case by the ends of the spring strips, whereas the second engagement means may be provided by intermediate portions of the spring strips.

The pot member may be made of synthetic plastic material or rubber material. In such cases, however, in which the pot member is to resist withdrawing forces between the stand tube and the insert strut unit, it may be preferable to make the pot member of sheet metal.

In particular for use of the column unit in chairs and tables, the insert strut unit may be variable in length.

For locking the insert strut unit in various lengths, the insert strut unit may comprise a hydraulic locking element, a hydro-pneumatic element, or a gas spring.

As is well known in the art, gas springs and hydropneumatic elements facilitate the adjustment of lengths in practice.

Hydraulic elements, hydropneumatic elements, and gas springs may be manufactured as separate units, namely as cylinder piston devices with a cylinder and a piston rod.

In this case, the cylinder may be rotatably and slidably guided within the stand tube, whereas the piston rod is directed toward the abutment means.

Furthermore the invention is directed to a pre-assembled bearing unit as a separate part available in trade which comprises at least one bearing disc, a plurality of roller bodies, and a preassembling holder unit.

Further, the invention is directed to a combination of such a pre-assembled bearing unit with an insert strut unit. Also these combinations may be sold as trade products.

The roller bodies of the bearing means preferably are balls. The above-mentioned cages are not absolutely necessary because the roller bearing also may be held between the bearing discs by the pre-assembling holder unit, particularly when the bearing discs are provided with respective concave bearing paths.

The various features of novelty which characterize the invention are pointed out with particularity in the claims annexed to and forming part of the disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

The invention will be explained in greater detail hereinafter with reference to an embodiment shown in the accompanying drawings in which.

DETAILED DESCRIPTION OF THE PREFERRED EMBODIMENTS

Figure 1:
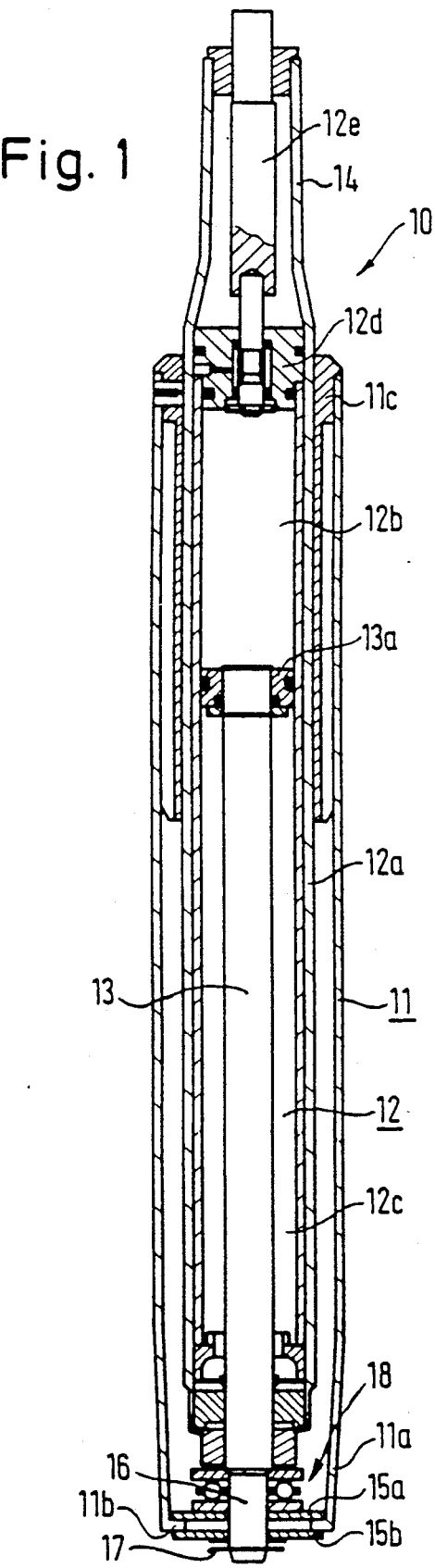
FIG. 1 shows a longitudinal section through a height adjustment column unit with a gas spring located in a vertical stand tube, which gas spring is mounted to rotate by way of an axial bearing unit.

The height adjustable column unit 10 illustrated in FIG. 1 comprises a stand tube 11. The lower end portion of the stand tube 11 is conical at 11a for being inserted in a socket of a base member (not shown). At the lower end of the stand tube 11, a radially inwardly directed abutment flange 11b is provided. An abutment plate 15a rests on the abutment flange 11b. A lower abutment plate 15b is applied to the lower side of the abutment flange 11b. A gas spring 12 is inserted in the stand tube 11. The gas spring 12 comprises a cylinder 12a and a piston rod 13. The cylinder 12a is axially slidably and rotatably received by a slide bush 11c inserted in the upper end portion of the stand tube 11. The piston rod 13 is provided with a piston 13a. The piston 13a divides the cavity within the cylinder 12a into two working chambers 12b and 12c. The working chambers 12b and 12c are interconnected by a bypass channel (not shown) with a valve installation 12d. The upper end of the cylinder is shaped as a cone 14 for carrying a socket of a seat plate or table plate (not shown). A control pin 12e serves to open and close the valve installation 12d for varying the length of the gas spring 12.

The lower end of the piston rod 13 is provided with a terminal stud 16. This terminal stud 16 extends through a bearing 18 carrying the lower end of the piston rod 13 on the abutment plate 15a. The lower end of the stud 16 is provided with a spring clip 17 at the lower side of the abutment plate 15b so as to prevent withdrawal of the gas spring 12 from the stand tube 11.

FIG. 1 only shows the basic features of a column unit to which the principles of the invention can be applied.

The invention is shown in more detail in FIGS. 2 to 5.

Figure 2:
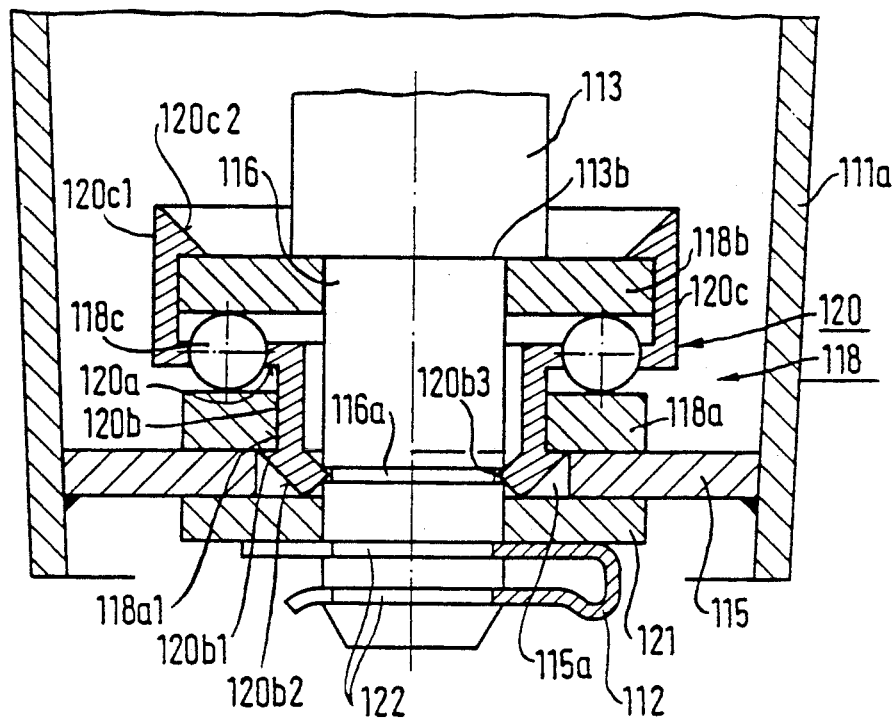
FIG. 2 shows an axial bearing for installation in a adjusting column unit according to FIG. 1 with components held together by a pre-assembling holder unit.

In FIG. 2, one recognizes the conical lower portion 111a of the stand tube with an abutment wall 115. One further recognizes the lower end of the piston rod 113 with the stud 116. The bearing unit 118 comprises a first bearing disc 118a, a second bearing disc 118b, and balls 118c. The bearing disc 118b is supported by a shoulder 113b of the piston rod 113 and the bearing disc 118a is supported by the abutment wall 115. The bearing discs 118a and 118b with the balls 118c therebetween are pre-assembled by a pre-assembling holder unit 120. This pre-assembling holder unit 120 comprises a substantially horizontal cage portion 120a receiving the balls 118c, a lower sleeve portion 120b, and an upper sleeve portion 120c. The lower sleeve portion 120b extends through a central hole 118a1 of the bearing disc 118a and engages the lower side of the bearing disc 118a by engagement hooks 120b1. The lower end of the lower sleeve portion 120b is provided with a conical face 120b2 which facilitates the passage of the hook 120b1 through the hole 118a1 of the bearing disc 118a. The upper sleeve portion 120c is provided with an engagement hook 120c1 which engages behind the upper face of the bearing disc 118b. A conical face 120c2 facilitates insertion of the bearing disc 118b in the upper sleeve portion 120c across the hook portion 120c1. It is to be noted that the pre-assembling holder unit forms a pre-assembled bearing unit 118 comprising the bearing discs 118a, 118b, and the balls 118c. This pre-assembled bearing unit 118 can be pre-assembled before being assembled with the stud 116. Thereafter the pre-assembled bearing unit 118 is pushed on the stud 116 until an edge portion 120b3 engages into a groove 116a of the stud 116. Thereupon the gas spring is inserted in the stand tube, as shown in FIG. 1, so that the stud 116 passes through a central opening 115a of the abutment plate 115. Now a washer 121 is applied to the lower side of the abutment plate 115, and the spring clip 112 is fixed on the lower end of the stud 116 by engaging grooves 122 of the stud.

Figure 4:
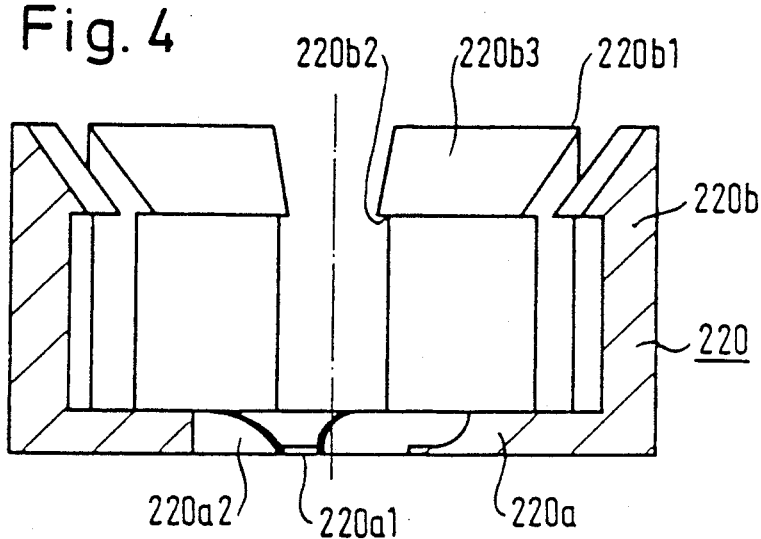
FIG. 4 shows a section on line IV—IV of FIG. 3.
Figure 3:
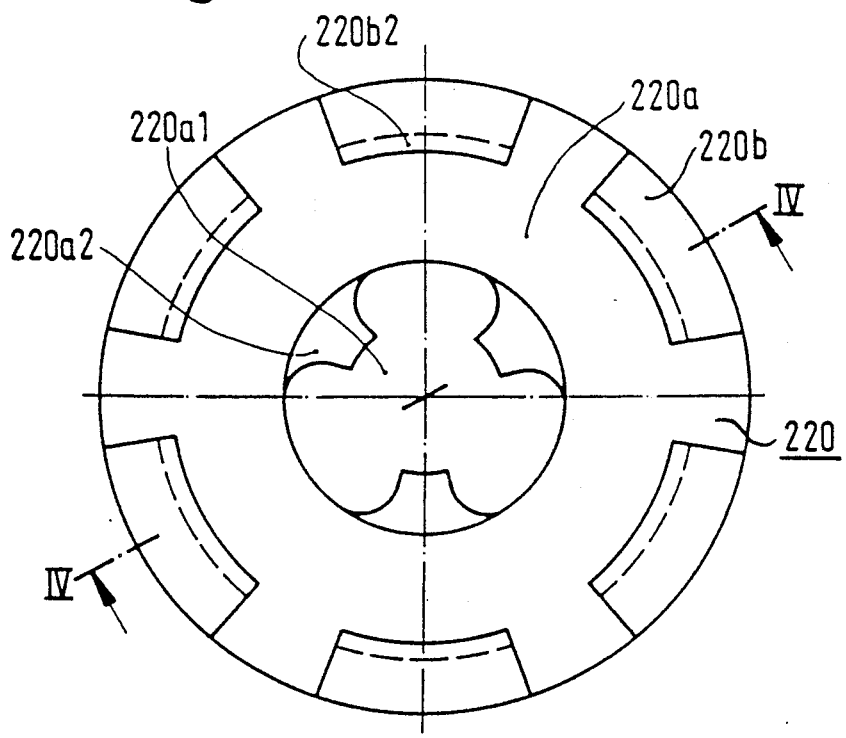
FIG. 3 shows a plan view of a further embodiment of a pre-assembling holder unit.

In FIGS. 3 and 4, a further embodiment of a pre-assembling holder unit is shown. The pre-assembling holder unit designated 220 has a pot shape with a bottom wall 220a and a side wall 220b, the side wall 200b being provided by a plurality of spring tongues 220b1 with engagement hooks 220b2 and conical faces 220b3. The bottom wall 220a provides a central opening 220a1 with a plurality of engagement tongues 220a2. The bearing discs and the rollers are not shown in FIGS. 3 and 4. One can readily understand, however, that the bearing discs and the balls received in a cage (not s can be accomodated within the pot 220 by urging them one after the other across the conical faces 220b3 downwards toward the bottom wall 220a. The upper bearing disc finally is secured by the engagement hooks 220b2. In this fashion a pre-assembled bearing unit is provided again which can be assembled with a stud, as shown in FIG. 2 at 116. The engagement tongues 220a2 come into engagement with a groove, as shown in FIG. 2 at 116a. In this manner the pre-assembled bearing unit can be pre-assembled separately from the gas spring and thereafter it can be snap-mounted on the lower stud of the piston rod. The connection of the stud with the abutment plate of the stand tube is accomplished as is shown and described in connection with the embodiment of FIG. 2.

Figure 5:
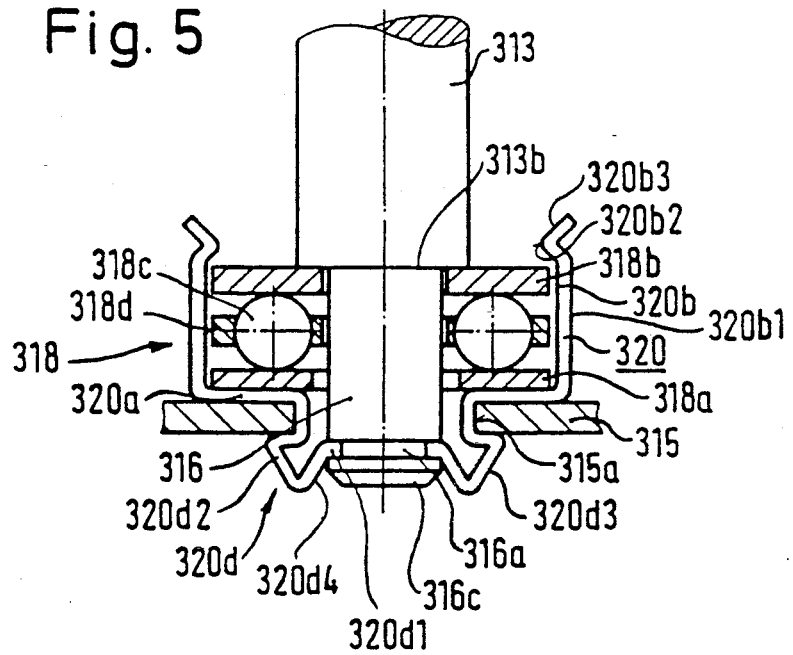
FIG. 5 shows a section through a third embodiment of a pre-assembling holder unit.

In FIG. 5, analogous parts are designated by the same reference numerals as used in FIG. 2, increased by 200.

The balls 318c are received by a separate cage 318d. The bearing discs 318a, 318b, and the cage 318d with the balls 318c are housed within a pot member 320. This pot member is made of sheet metal and comprises a bottom wall 320a and a side wall 320b consisting of a plurality of spring tongues 320b1. The spring tongues are provided with engagement hooks 320b2 and conical faces 320b3. The bearing discs 318a and 318b and the case 318d are pressed into the pot member 320 toward the bottom 320a across the conical faces 320b3. The engagement hooks 320b2 secure the upper bearing disc 318b within the pot member 320.

The bottom wall 320a is provided with spring strips 320d which have ends 320d1 engaging into a groove 316a of the stud 316 and intermediate portions 320d2 which engage the lower side of the abutment plate 315. Moreover conical legs 320d3 are provided which can slide over the circumferential edge of the central opening 315a.

The bearing discs 318a, 318b and the cage 318d are pre-assembled with the pot member 320. Thereafter the pot member 320 is connected to the stud 316 so that the ends 320d enter the groove 316a. This is facilitated by a conical face 316c at the lower end of the stud 316.

Thereupon the gas spring is inserted into the stand tube so that the conical legs 320d3 engage the circumferential edge of the central opening 315a. The spring strips 320d are radially compressed thereby until the intermediate portions 320d2 snap behind the lower face of the abutment plate 315. The gas spring can be easily dismounted from the abutment plate 315 by deflecting the ends 320d1 of the spring strips 320d out of the groove 316a by a tool engaging at 320d4. Thereafter the pot member 320 can be dismounted easily from the abutment plate 315 by deflecting the intermediate portions 320d2 radially inwards.

While a specific embodiment of the invention has been shown and described in detail to illustrate the application of the inventive principles, it will be understood that the invention may be embodied otherwise without departing from these principles.

The reference numerals in the claims are only used for facilitating the understanding and are by no means restrictive.

In particular, the reference numerals used in the claims do not restrict the respective claims to those embodiments in which the reference numerals occur.

We claim:

1. A column unit comprising a stand tube (11) having an axis and two end portions, a first end portion (11a) being provided with axial abutment means (11b, 15a, 15b) and a second end portion (11c) having an insert opening, and further comprising a pre-assembled insert strut unit (12) inserted into said stand tube (11) through said insert opening along said axis, said insert strut unit (12) having a first end portion (16) adjacent said first end portion (11a) of said stand tube (11) and a second end portion (14) outside said stand tube (11), said insert strut unit (12) being rotatable with respect to said stand tube (11) about said axis and being axially fixed adjacent its first end portion (16) with respect to said stand tube (11) by said abutment means (11b, 15a, 15b), roller bearing means (18) being provided axially between said first end portion (16) of said insert strut unit (12) and said abutment means (11b, 15a, 15b) of said stand tube (11), said roller bearing means (18) comprising a first bearing face supported by said abutment means (11b, 15a, 15b), a second bearing face supported by said insert strut unit (12), a plurality of roller bodies (118c) axially between said first and second bearing faces, said bearing faces being provided by respective first and second bearing discs (118a, 118b), said roller bearing means (18) and said abutment means (11b, 15a, 15b) being disposed such that, when an axial load force acts onto said strut unit (12) adjacent said second end portion (14) thereof in a direction towards said abutment means (11b, 15a, 15b), the axial load force is transmitted to said abutment means (11b, 15a, 15b) through said roller bearing means (18), and, when an axial withdrawal force acts on said strut unit (12) adjacent said second end portion (14) thereof in a direction away from said abutment means (11b, 15a, 15b), the axial withdrawal force is transmitted to said abutment means (11b, 15a, 15b) by withdrawal preventing means (17) connected with said first end portion (16) of said strut unit (12), without transmission of the withdrawal force through said roller bearing means (18).

said bearing discs (118a, 118b) and said roller bodies (118c) being pre-assembled as a primary pre-assembled unit (118), which is secured against disintegration by disintegration preventing means (120), said primary pre-assembled unit (118) and said pre-assembled strut unit (12) being combined into a secondary pre-assembled unit (12, 118) and secured against separation from each other by securingly engaged first engagement means (116a, 120b3) of said strut unit (12) and said primary pre-assembled unit (118), said securing engagement being obtainable upon non-rotating axial approach of said strut unit (12) and said primary pre-assembled unit (118).

said secondary pre-assembled unit (12, 118) being inserted as a completed entity into said stand tube (11), and being secured against withdrawing in the fully inserted position by said withdrawal preventing means (17).

2. The column unit as set forth in claim 1, said first end portion (16) of said insert strut unit (12) comprising a terminal stud (16), said bearing faces comprising central holes, said terminal stud (16) extending through said central holes of said bearing faces and being surrounded by said plurality of roller bodies (118c).

3. The column unit as set forth in claim 1, said abutment means (115) of said stand tube comprising an abutment wall (115) adjacent said first end portion (111a) of said stand tube, said insert strut unit being axially fixed to said abutment wall (115).

4. The column unit as set forth in claim 1, said disintegration preventing means comprising a pre-assembling holder unit (120) having first engagement means (120b3) for engagement with said insert strut unit, said first engagement means (120b3) securing said pre-assembled unit (118) axially with respect to said insert strut unit.

5. The column unit as set forth in claim 1, said first engagement means (116a, 120b3) being snap engagement means.

6. The column unit as set forth in claim 5, said first engagement means (120b3) comprising a circumferential, radially outwardly open groove (116a) of said insert strut unit adjacent the first end portion thereof, and an edge portion (120b3) of said primary pre-assembled unit (118).

7. The column unit as set forth in claim 1, said disintegration preventing means comprising a pre-assembling holder unit (320) which is engagement by second engagement means (320d2, 315a) with said abutment means (315), said second engagement means (320d2, 315a) acting as said withdrawal preventing means, said second engagement means (315a, 320d2) being interengageable upon axial approach of said pre-assembling holder unit (320) and said abutment means (315).

8. The column unit as set forth in claim 7, said second engagement means (320d2, 315a) being snap engagement means making snap engagement when said secondary pre-assembled unit (12, 118) axially approaches said abutment means (315).

9. The column unit as set forth in claim 7 or claim 8, said second engagement means (320d2, 315a) comprising a circumferential edge of a central opening (315a) provided in an abutment wall (315) of said stand tube adjacent the first end portion thereof, and hook members (320d2) of said pre-assembling holder unit (320) deflectable in radial direction.

10. The column unit as set forth in claim 1, said disintegration preventing means comprising a pre-assembling holding unit (120) comprising a roller cage portion (120a) receiving said roller bodies (118c), a first disc holder portion (120b) engaging said first bearing disc (118a) and a second disc holder portion (120c) engaging said second bearing disc (118b), said first disc holder portion (120) being engaged with a circumferential edge of a central hole (118a1) of said first bearing disc (118a), said second disc holder portion (120c) being engaged with a radially outer, circumferential edge of said second bearing disc (118b).

11. The column unit as set forth in claim 10, at least one of said disc holder portions (120b, 120c) making snap engagement with the respective bearing disc (118a, 118b).

12. The column unit as set forth in claim 10, said first disc holder portion (120b) comprising a part (120b3) of said first engagement means (116a, 120b3).

13. The column unit as set forth in claim 10, said roller cage portion (120a), said first disc holder portion (120b), and said second disc holder portion (120c) being integrally shaped.

14. The column unit as set forth in claim 13, said roller cage portion (120a), said first disc holder portion (120b), and said second disc holder portion (120c) being integrally shaped of synthetic plastic material.

15. The column unit as set forth in claim 1, said disintegration preventing means comprising a pre-assembling holder unit (320) comprising a pot member (320) having a pot bottom (320a), and pot wall means (320b), a first bearing disc (318a), a roller cage (318d) receiving the roller bodies (318c) and a second bearing discs (318b) being superposed on said pot bottom (320a), said pot wall means (320b) being provided with securing means (320b2) for securing said bearing discs (318a, 318b) and said roller cage (318d) within said pot member (320).

16. The column unit as set forth in claim 15, said securing means (320b2) being snap securing means.

17. The column unit as set forth in claim 15, said pot wall means (320b) consisting of a plurality of spring tongues (320b1).

18. The column unit as set forth in claim 15, said pot bottom (320a) having a central hole, a terminal stud (316) of said first end portion of said insert strut unit extending through said central hole, said pot bottom (320a) being provided adjacent said central hole with a part (320d1) of said first engagement means (316a, 320d1) engageable with a radially outwardly open, circumferential groove (316a) of said terminal stud (316).

19. The column unit as set forth in claim 18, said bottom wall (320a) being engageable adjacent said central hole by second engagement means (315a, 320d2) with a central opening (315a) provided in an abutment wall (315) adjacent the first end portion of said stand tube.

20. The column unit as set forth in claim 7 or 19, said second engagement means (315a, 320d2) being second snap engagement means.

21. The column unit as set forth in claim 19, said first (316a, 320d1) and said second (315a, 320d2) engagement means comprising a plurality of multiple-bent spring strips (320d), said first engagement means (316a, 320d1) comprising the ends of said spring strips (320d), said second engagement means (315a, 320d2) comprising intermediate portions (320d2) of said spring strips (320d).

22. The column unit as set forth in claim 15, said pot member (220) being made of synthetic plastic material.

23. The column unit as set forth in claim 15, said pot member (320) being made of sheet metal.

24. The column unit as set forth in claim 1, said insert strut unit (12) being variable in length.

25. The column unit as set forth in claim 24, said insert strut unit comprising a fluid operated element.

26. The column unit as set forth in claim 24, said insert strut unit (12) comprising a gas spring.

27. The column unit as set forth in claim 24, said insert strut unit (12) comprising a cylinder piston device with a cylinder (12a) and a piston rod (13), said cylinder (12a) being rotatably and slidably guided within said stand tube (11), said piston rod (13) being directed toward said abutment means (11b, 15a, 15b).

28. A column unit as set forth in claim 1, said primary pre-assembled unit (118) comprising roller body cage means (120a).

29. A column unit as set forth in claim 1, said secondary pre-assembled unit (12, 118) being withdrawable as a completed entity from said stand tube (11) when said withdrawal preventing means are released.

30. In a column unit comprising a stand tube (11) having an axis and two end portions, a first end portion (11a) being provided with axial abutment means (11b, 15a, 15b) and a second end portion (11c) having an insert opening, and further comprising a pre-assembled insert strut unit (12) inserted into said stand tube (11) through said insert opening along said axis, said insert strut unit (12) having a first end portion (16) adjacent said first end portion (11a) of said stand tube (11) and a second end portion (14) outside said stand tube (11), said insert strut unit (12) being rotatable with respect to said stand tube (11) about said axis and being axially fixed adjacent its first end portion (16) with respect to said stand tube (11) by said abutment means (11b, 15a, 15b), roller bearing means (18) being provided axially between said first end portion (16) of said insert strut unit (12) and said abutment means (11b, 15a, 15b) of said stand tube (11), said roller bearing means (18) comprising a first bearing face supported by said abutment means (11b, 15a, 15b), a second bearing face supported by said insert strut unit (12), a plurality of roller bodies (118c) axially between said first and second bearing faces, said bearing faces being provided by respective first and second bearing discs (118a, 118b), said roller bearing means (18) and said abutment means (11b, 15a, 15b) being disposed such that, when an axial load force acts onto said strut unit (12) adjacent said second end portion (14) thereof is a direction towards said abutment means (11b, 15a, 15b), the axial load force is transmitted to said abutment means (11b, 15a, 15b) through said roller bearing means (18), and, when an axial withdrawal force acts on said strut unit (12) adjacent said second end portion (14) thereof in a direction away from said abutment means (11b, 15a, 15b), the axial withdrawal force is transmitted to said abutment means (11b, 15a, 15b) by withdrawal preventing means (17) connected with said first end portion (16) of said strut unit (12), without transmission of the withdrawal force through said roller bearing means (18), said bearing discs (118a, 118b) and said roller bodies (118c) being pre-assembled as a primary pre-assembled unit (118), which is secured against disintegration by disintegration prevention means (120), said primary pre-assembled unit (118) and said pre-assembled strut unit (12) being combined into a secondary pre-assembled unit (12, 118) and secured against separation from each other by securingly engaged first engagement means (116a, 120b3) of said strut unit (12) and said primary pre-assembled unit (118), said securing engagement being obtainable upon non-rotating axial approach of said strut unit (12) and said primary pre-assembled unit (118), said secondary pre-assembled unit (12, 118) being inserted as a completed entity into said stand tube (11), and being secured against withdrawing in the fully inserted position by said withdrawal preventing means (17), said primary pre-assembled unit (118) comprising said bearing discs (118a, 118b), said roller bodies (118c), said disintegration preventing means (120), and a respective part (120b3) of said first engagement means (116a, 120b3) for engagement with a further part (116a) of said first engagement means (116a, 120b3) allocated to said strut unit (12).

31. In a column unit comprising a stand tube (11) having an axis and two end portions, a first end portion (11a) being provided with axial abutment means (11b, 15a, 15b) and a second end portion (11c) having an insert opening, and further comprising a pre-assembled insert strut unit (12) inserted into said stand tube (11) through said insert opening along said axis, said insert strut unit (12) having a first end portion (16) adjacent said first end portion (11a) of said stand tube (11) and a second end portion (14) outside said stand tube (11), said insert strut unit (12) being rotatable with respect to said stand tube (11) about said axis and being axially fixed adjacent its first end portion (16) with respect to said stand tube (11) by said abutment means (11b, 15a, 15b), roller bearing means (18) being provided axially between said first end portion (16) of said insert strut unit (12) and said abutment means (11b, 15a, 15b) of said stand tube (11), said roller bearing means (18) comprising a first bearing face supported by said abutment means (11b, 15a, 15b), a second bearing face supported by said insert strut unit (12), a plurality of roller bodies (118c) axially between said first and second bearing faces, said bearing faces being provided by respective first and second bearing discs (118a, 118b), said roller bearing means (18) and said abutment means (11b, 15a, 15b) being disposed such that, when an axial load force acts onto said strut unit (12) adjacent said second end portion (14) thereof in a direction towards said abutment means (11b, 15a, 15b), the axial load force is transmitted to said abutment means (11b, 15a, 15b) through said roller bearing means (18), and, when an axial withdrawal force acts on said strut unit (12) adjacent said second end portion (14) thereof in a direction away from said abutment means (11b, 15a, 15b), the axial withdrawal force is transmitted to said abutment means (11b, 15a, 15b) by withdrawal preventing means (17) connected with said first end portion (16) of said strut unit (12), without transmission of the withdrawal force through said roller bearing means (18).

said bearing discs (118a, 118b) and said roller bodies (118c) being pre-assembled as a primary pre-assembled unit (118), which is secured against disintegration by disintegration preventing means (120), said primary pre-assembled unit (118) and said pre-assembled strut unit (12) being combined into a secondary pre-assembled unit (12, 118) and secured against separation from each other by securingly engaged first engagement means (116a, 120b3) of said strut unit (12) and said primary pre-assembled unit (118), said securing engagement being obtainable upon non-rotating axial approach of said strut unit (12) and said primary pre-assembled unit (118), said secondary pre-assembled unit (12, 118) being inserted as a completed entity into said stand tube (11), and being secured against withdrawing in the fully inserted position by said withdrawal preventing means (17), said secondary pre-assembled unit (12, 118) comprising said strut unit (12) and said primary pre-assembled unit (118), said primary pre-assembled unit (118) comprising said bearing discs (118a, 118b), said roller bodies (118c), said disintegration preventing means (120) and a respective part (120b3) f said first engagement means (116a, 120b3), said strut unit (12) comprising said first end portion (16) and said second end portion (14), said first end portion (16) being provided with a further part (116a) of said first engagement means (116a, 120b3), said parts of said first engagement menas (116a, 120b3) being engaged by non-rotating axial approach of said strut unit (12) and said primary pre-assembled unit (118) such that unintended separation of said strut unit (12) and said pre-assembled unit (118) is prevented, said secondary pre-assembled unit (12, 118) being adapted for being fixed to said abutment means (11b, 15a, 15b).

32. A column unit comprising a stand tube (11) having an axis and two end portions, a first end portion (11a) being provided with axial abutment means (11b) and a second end portion (11c) having an insert opening, and further comprising a pre-assembled insert strut unit (12) inserted into said stand tube (11) through said insert opening along said axis, said insert strut unit having a first end portion (1 adjacent said first end portion (11a) of said stand tube (11) and a second end portion (14) outside said stand tube (11), said insert strut unit (12) being rotatable with respect to said stand tube (11) about said axis and being axially fixed adjacent its first end portion (16) with respect to said abutment means (11b), roller bearing means (18) being provided axially a between said first end portion (16) of said insert strut unit (12) and said abutment means (11b) of said stand tube (11), said roller bearing means (18) comprising a first bearing face supported by said abutment means (11b), a second bearing face supported by said insert strut unit (12), a plurality of roller bodies (118c) axially between said first and second bearing faces, both said first and said second bearing faces being provided by respective first and second bearing discs (118a, 118b)

a pre-assembling holder unit (120) being provided which holds both said bearing discs (118a, 118b) and said roller bodies (118c) together as a pre-assembled unit, said pre-assembled unit (118) being pre-assembled before being combined with said insert strut unit (12) and remaining within said column unit after combining said stand tube (11), said insert strut unit (12) and said pre-assembled unit (118), said first end portion (16) of said insert strut unit (12) comprising a terminal stud (16), said bearing faces comprising central holes, said terminal stud (16) extending through said central holes and being supported by said plurality of roller bodies (118c), said pre-assembling holder unit (120) having first engagement means (120b3) for engagement with said terminal stud (16) of said insert strut unit, said first engagement means (120b3) fixing said pre-assembled unit (118) axially with respect to said insert strut unit, said first engagement means (120b3) being first snap engagement means for snap engagement with said terminal studs (16) when said insert strut unit axially approaches said pre-assembled unit, said first engagement means (120b3) being engageable with a circumferential, radially outwardly open groove (116a) of said terminal stud (16), said pre-assembling holder unit (320) comprising a pot member (320) having a pot bottom (320a) separate from said first and second bearing discs, and pot wall means (320b), said second bearing disc (318b) comprising said second bearing face above said pot bottom (320a), said pot wall means (320b) comprising securing means (320b2) for securing said second bearing disc (318b) within said pot member (320), said securing means (320b2) being snap securing means, said pot bottom (320a) having a central hole, said terminal stud (316) of said first end portion of said insert strut unit extending through said central hole, said pot bottom being provided adjacent said central hole with said first engagement means (320d1) engageable with said radially outwardly open, circumferential groove (316a) of said terminal stud (316).

33. A column unit comprising a stand tube (11) having an axis and two end portions, a first end portion (11a) being provided with axial abutment means (11b) and a second end portion (11c) having an insert opening, and further comprising a pre-assembled insert strut unit (12) inserted into said stand tube (11) through said insert opening along said axis, said insert strut unit having a first end portion (16) adjacent said first end portion (11a) of said stand tube (11) and a second end portion (14) outside said stand tube (11), said insert strut unit (12) being rotatable with respect to said stand tube (11) about said axis and being axially fixed adjacent its first end portion (16) with respect to said abutment means (11b), roller bearing means (18) being provided axially between said first end portion (16) of said insert strut unit (12) and said abutment means (11b) of said stand tube (11), said roller bearing means (18) comprising a first bearing face supported by said abutment means (11b), a second bearing face supported by said insert strut unit (12), a plurality of roller bodies (118c) axially between said first and second bearing faces, both said first and said second bearing faces being provided by respective first and second bearing discs (118a, 118b)

a pre-assembling holder unit (120) being provided which holds both said bearing discs (118a, 118b) and said roller bodies (118c) together as a pre-assembled unit, said pre-assembled unit (118) being pre-assembled before being combined with said insert strut unit (12) and remaining within said column unit after combining said stand tube (11), said insert strut unit (12) and said pre-assembled unit (118), said pre-assembling holder unit (320) comprising a pot member (320) having a pot bottom (320a), and pot wall means (320b), a first bearing disc (318a), a roller cage (318d) receiving the roller bodies (318c) and a second bearing disc (318b) being superposed on said pot bottom (320a), said pot wall means (320b) being provided with securing means (320b2) for securing said bearing discs (318a, 318b) and said roller cage (318d) with said pot member (320), said pot wall means (320b) consisting of a plurality of spring tongues (320b1).

34. A column unit comprising a stand tube (11) having an axis and two end portions, a first end portion (11a) being provided with axial abutment means (11b, 15a, 15b) and a second end portion (11c) having an insert opening, and further comprising a pre-assembled insert strut unit (12) inserted into said stand tube (11) through said insert opening along said axis, said insert strut unit (12) having a first end portion (16) adjacent said first end portion (11a) of said stand tube (11) and a second end portion (14) outside said stand tube (11), said insert strut unit (12) being rotatable with respect to said stand tube (11) about said axis and being axially fixed adjacent its first end portion (16) with respect to said stand tube (11) by said abutment means (11b, 15a, 15b), roller bearing means (18) being provided axially between said first end portion (16) of said insert strut unit (12) and said abutment means (11b, 15a, 15b) of said stand tube (11), said roller bearing means (18) comprising a first bearing face supported by said abutment means (11b), a second bearing face supported by said insert strut unit (12), a plurality of roller bodies (118c) axially between said first and second bearing faces, said bearing faces being provided by respective first and second bearing discs (118a, 118b), said bearing discs (118a, 118b) and said roller bodies (118c) being pre-assembled as a primary pre-assembled unit (118), which is secured against disintegration by disintegration preventing means (120), said primary pre-assembled unit (118) and said pre-assembled strut unit (12) being combined into a secondary pre-assembled unit (12, 118) and secured against separation from each other by securingly engaged first engagement means (116a, 120b3) of said strut unit (12) and said primary pre-assembled unit (118), said secondary pre-assembled unit (12, 118) being inserted as a completed entity into said stand tube (11) and being secured against withdrawal in the fully inserted position by withdrawal preventing means (17).

35. A method of assembling a column unit, said column unit comprising a stand tube (11) having an axis and two end portions, a first end portion (11a) being provided with axial abutment means (11b, 15a, 15b) and a second end portion (11c) having an insert opening, and further comprising a pre-assembled insert strut unit (12) inserted into said stand tube (11) through said insert opening along said axis, said insert strut unit (12) having a first end portion (16) adjacent said first end portion (11a) of said stand tube (11) and a second end portion (14) outside said stand tube (11), said insert strut unit (12) being rotatable with respect to said stand tube (11) about said axis and being axially fixed adjacent its first end portion (16) with respect to said stand tube (11) by said abutment means (11b, 15a, 15b), roller bearing means (18) being provided axially between said first end portion (16) of said insert strut unit (12) and said abutment menas (11b, 15a, 15b) of said stand tube (11), said roller bearing means (18) comprising a first bearing face supported by said abutment means (11b, 15a, 15b), a second bearing face supported by said insert strut unit (12), a plurality of roller bodies (118c) axially between said first and second bearing faces, said bearing faces being provided by respective first and second bearing discs (118a, 118b), said roller bearing means (18) and said abutment means (11b, 15a, 15b) being disposed such that,

- when an axial load force acts onto said strut unit (12) adjacent said second end portion (14) thereof in a direction towards said second end portion (14) thereof in a direction towards said abutment means (11b, 15a, 15b), the axial load force is transmitted to said abutment means (11b, 15a, 15b) through said roller bearing means (18), and,
- when an axial withdrawal force acts on said strut unit (12) adjacent said second end portion (14) thereof in a direction away from said abutment means (11b, 15a, 15b), the axial withdrawal force is transmitted to said abutment means (11b, 15a, 15b) by withdrawal preventing menas (17) connected with said first end portion (16) of said strut unit (12), without transmission of the withdrawal force through said roller bearing menas (18),
- said bearing discs (118a, 118b) and said roller bodies (118c) being pre-assembled as a primary pre-assembled unit (118), which is secured against disintegration by disintegration preventing means (120), said primary pre-assembled unit (118) and said pre-assembled strut unit (12) being combined into a secondary pre-assembled unit (12, 118) and secured against separation from each other by securingly engaged first engagement means (116a, 120b3) of said strut unit (12) and said primary pre-assembled unit (118), said securing engagement being obtainable upon non-rotating axial approach of said strut unit (12) and said primary pre-assembled unit (118),
- said secondary pre-assembled unit (12, 118) being inserted as a completed entity into said stand tube (11), and being secured against withdrawing in the fully inserted position by said withdrawal preventing means (17),
- said method comprising pre-assembling said bearing discs (118a, 118b) and said roller bodies (118c) into said primary pre-assembled unit (118), securing said pre-assembled unit (118) against disintegration by disintegration preventing means (120), combining said primary pre-assembled unit (118) and said pre-assembled strut unit (12) into a second pre-assembled unit (12, 118) and securing said primary pre-assembled unit (118) and said strut unit (12) against separation from each other by non-rotating axial approach of said strut unit (12) and said primary pre-assembled unit (118) into securing engagement, and inserting said secondary pre-assembled unit (12, 118) as a completed entity into said stand tube (11) so as to secure said secondary pre-assembled unit (12, 118) by said withdrawal preventing means (17) in the fully inserted position.

* * * * *

UNITED STATES PATENT AND TRADEMARK OFFICE
CERTIFICATE OF CORRECTION

PATENT NO. : 5,120,011
DATED : June 9, 1991
INVENTOR(S) : Rolf Mintgen and Hans-Josef Hosan It is certified that error appears in the above-identified patent and that said Letters Patent is hereby corrected as shown below:

```
Title page, item [56], column 1, last line, "9/1989" should read --9/1987--;
Col. 4, line 24, "m be" should read --may be--;
Col. 5, line 13, "adjusting" should read --height adjusting--;
Col. 6, line 29, "200b" should read --220b--;
Col. 6, line 36, "(not s can" should read --(not shown) can--;
Col. 7, line 8, "320d" should read --320d1--;
Col. 8. line 48, "portion" should read --portion (116)--;
Col. 8, line 53, "engagement" should read --engageable--;
Col. 9, line 6, "holding" should read --holder--;
Col. 9, line 36, "discs" should read --disc--;
Col. 10, line 55, "is a" should read --in a--;
Col. 12, line 22, "f" should read --of--;
Col. 12, line 28, "menas" should read --means--;
Col. 12, line 43, "(1" should read --(16)--;
Col. 12, line 49, "axially a" should read --axially--;
Col. 15, line 3, "menas" should read --means--;
Col. 15, lines 15-16, delete "said second end portion (14)
thereof in a direction towards"
```

Signed and Sealed this

Twelfth Day of October, 1993

Attest:

BRUCE LEHMAN

Attesting Officer

Commissioner of Patents and Trademarks